US012559069B2

(12) United States Patent
Frea

(10) Patent No.: US 12,559,069 B2
(45) Date of Patent: Feb. 24, 2026

(54) SYSTEM FOR DETERMINING THE FORWARD SPEED OF AT LEAST ONE VEHICLE

(71) Applicant: FAIVELEY TRANSPORT ITALIA S.P.A., Turin (IT)

(72) Inventor: Matteo Frea, Turin (IT)

(73) Assignee: Faiveley Transport Italia S.P.A., Turin (IT)

( * ) Notice: Subject to any disclaimer, the term of this patent is extended or adjusted under 35 U.S.C. 154(b) by 190 days.

(21) Appl. No.: 18/686,315

(22) PCT Filed: Aug. 25, 2022

(86) PCT No.: PCT/IB2022/057966
§ 371 (c)(1),
(2) Date: Feb. 23, 2024

(87) PCT Pub. No.: WO2023/026230
PCT Pub. Date: Mar. 2, 2023

(65) Prior Publication Data
US 2024/0359670 A1      Oct. 31, 2024

(30) Foreign Application Priority Data

Aug. 27, 2021      (IT) ........................ 102021000022442

(51) Int. Cl.
*B60T 8/17*            (2006.01)
*B60T 17/22*          (2006.01)
(52) U.S. Cl.
CPC .......... *B60T 8/1705* (2013.01); *B60T 17/228* (2013.01); *B60T 2250/04* (2013.01)

(58) Field of Classification Search
CPC .... B60T 8/1705; B60T 8/1893; B60T 8/3235; B60T 8/3245; B60T 17/228; B60T 2250/04
See application file for complete search history.

(56) References Cited

U.S. PATENT DOCUMENTS 10,459,001 B2 * 10/2019 Foerster .................. B60T 8/172
2004/0046442 A1    3/2004 Aurich et al.
(Continued)

OTHER PUBLICATIONS

ISA European Patent Office, International Search Report Issued in Application No. PCT/IB2022/057966, Feb. 14, 2023, WIPO, 2 pages.

*Primary Examiner* — Erick R Solis
(74) *Attorney, Agent, or Firm* — K&L Gates LLP

(57) ABSTRACT

Described is a system for determining the forward speed of at least one vehicle, comprising control means, each associated with at least one axle, and a communication means for transmitting signals or values between the control means. At measurement instants successive in time, each control means generates a corresponding sliding signal of the respective at least one axle. At a sharing instant, each control means transmits the respective sliding signal, and in the no-sliding condition, the value of a quantity related to the rotation of the respective axle or its own estimated forward speed of the vehicle to the other control means. When all the sliding signals indicate a sliding condition, one of said control means controls first braking means associated with one of the axles, so as to reduce a braking force applied to said axle.

15 Claims, 5 Drawing Sheets

(56)          References Cited

U.S. PATENT DOCUMENTS

| | | |
|---|---|---|
| 2015/0367870 A1 | 12/2015 | Bildstein et al. |
| 2016/0207513 A1 | 7/2016 | Jennek et al. |
| 2017/0313329 A1* | 11/2017 | Peltz .................. B61L 15/0072 |
| 2020/0369305 A1 | 11/2020 | Tione |
| 2021/0039691 A1* | 2/2021 | Tione .................... B60T 17/228 |
| 2021/0114570 A1* | 4/2021 | Hirokawa ............ B60T 8/1761 |
| 2024/0201221 A1* | 6/2024 | Frea ...................... B60T 8/1705 |

* cited by examiner

SYSTEM FOR DETERMINING THE FORWARD SPEED OF AT LEAST ONE VEHICLE

CROSS REFERENCE TO RELATED APPLICATIONS

The present application is a U.S. National Phase of International Application No. PCT/IB2022/057966 entitled "SYSTEM FOR DETERMINING THE FORWARD SPEED OF AT LEAST ONE VEHICLE," and filed on Aug. 25, 2022. International Application No. PCT/IB2022/057966 claims priority to Italian Patent Application No. 102021000022442 filed on Aug. 27, 2021. The entire contents of each of the above-listed applications are hereby incorporated by reference for all purposes.

TECHNICAL FIELD

The present invention relates, in general, to the vehicle sector: in particular, the invention relates to a system for determining the forward speed of at least one vehicle.

PRIOR ART

Sliding (also known as slip or slide) is understood to be a condition where there is a difference between the rotational speed of an axle or wheel of a vehicle and the speed of travel of the vehicle itself. This difference is usually defined as the sliding speed.

Referring, for example, to the sector of railway vehicles, the sliding speed may be calculated by way of the following formula:

$$V_{sliding} = V_{RV} - \omega_{axle} * R \qquad (1)$$

where $V_{RV}$ is the longitudinal speed of travel of the vehicle, $\omega_{axle}$ is the angular speed of the axle, and R is the radius of a wheel of the axle.

More modern railway vehicles have electronic systems installed on board that generally include subsystems for controlling the sliding of the wheels, adapted to intervene both when the vehicle is in a traction phase and when the vehicle is in a braking phase.

Subsystems of this kind are known as anti-skid or anti-sliding systems or are also known as WSP (wheel slide protection) systems.

A system for controlling the adhesion of the wheels in an anti-sliding function according to the prior art is shown schematically in FIG. 1, which refers to a vehicle comprising n controlled axles A1, A2, . . . , An. The axles A1, A2, . . . , An comprise respective shafts S1, S2, . . . , Sn and respective pairs of wheels W1, W2, . . . , Wn connected thereto for conjoint rotation.

In FIG. 1, only one wheel of each axle is generally shown.

The WSP system in FIG. 1 comprises an electronic control unit ECU, typically based on a microprocessor architecture, which receives tachometric signals relating to the angular speed of each axle A1, A2, . . . , An from sensors SS1, SS2, . . . , SSn associated with these axles respectively. The electronic unit ECU is also connected to torque control devices TC1, TC2, . . . , TCn, which are each associated with a relevant axle A1, A2, . . . , An.

The electronic unit ECU is arranged to modulate the torque applied to each axle according to a predetermined algorithm if, when torque is applied during a traction or braking phase in situations of degraded adhesion, the wheels of one or more axles result in a condition of possible incipient sliding. The torque is modulated in such a way as to prevent the axles from jamming completely, possibly in such a way as to bring each axle into a controlled sliding situation, with a view to recover adhesion and in any case for the entire duration of the situation of degraded adhesion.

It is evident that knowledge of the instantaneous speed of the vehicle $V_{RV}(t)$ is fundamental for correctly controlling the sliding.

One known method for accurately tracking the forward speed of a railway vehicle requires the maintenance of an idle axle, i.e. an axle which is not subjected to traction or braking torques. This is required to ensure that the measurement of its speed is the best reproduction of the real speed Vreal of said railway vehicle. This solution is particularly effective in the case of particularly low adhesion between the wheels and the track. In this case, in the event of traction or braking, all of said wheels could enter a slippage condition and would therefore not be able to provide correct information regarding the real speed of the vehicle. An idle axle which is not subjected to traction or braking torques could continue to accurately track the speed of the vehicle.

Clearly, the use of an "idle" axle entails a momentary loss of traction and braking capacity of the convoy.

For example, FIG. 2a shows an example composition comprising two independent cars while FIG. 2b shows an example composition comprising two cars constrained by means of a Jacobs bogie. The use of an idle axle reduces the traction and braking capacity by 12.5% in the former case and by 16.7% in the latter case.

Where there are a plurality of electronic units ECU each arranged to modulate the torque applied to respective groups of axles, for example a first electronic unit ECU arranged to control the axles of a first vehicle in a convoy and a second electronic unit ECU arranged to control the axles of a second vehicle in the convoy, disadvantageously, each electronic unit ECU may bring an axle controlled by it into the "idle" axle condition.

Modern railway vehicle architectures, particularly for underground railways, tend to have very limited compositions, for example are made of two carriages. In this case, the use of a plurality of "idle" axles could lead to a significant loss of traction and braking capacity of the vehicle or convoy.

Referring again to FIG. 2a and FIG. 2b, for example, the use of two idle axles reduces traction and braking capacity by 25% in the former case and as much as 33.4% in the latter case.

This limitation, understandably, greatly impairs the traction and braking capacity of the vehicle or convoy in a sliding condition.

The disadvantages described above with reference to the railway vehicle sector also finds a similar application in vehicles in further sectors, such as road vehicles, which have the possibility of bringing an axle into an "idle" axle condition in case of sliding.

SUMMARY OF THE INVENTION

Thus, one object of the present invention is to provide a solution to ensure minimal loss of traction and braking capacity of at least one vehicle or convoy, even in a sliding condition, while maintaining the ability to ensure the determination of the forward speed of at least one vehicle or convoy.

The above and other objects and advantages are achieved, according to an aspect of the invention, by a system for determining a forward speed of at least one vehicle having the features defined in claim 1. The aforesaid and other objects and advantages are achieved, according to a further aspect of the invention, by a vehicle which has the features defined in claim 14. Preferred embodiments of the invention are defined in the dependent claims, the content of which is to be understood as an integral part of the present description.

BRIEF DESCRIPTION OF THE DRAWINGS

The functional and structural features of some preferred embodiments of a system for determining a forward speed of at least one vehicle and of a vehicle according to the invention will now be described. Reference is made to the accompanying drawings, in which.

DETAILED DESCRIPTION

Figure 1:
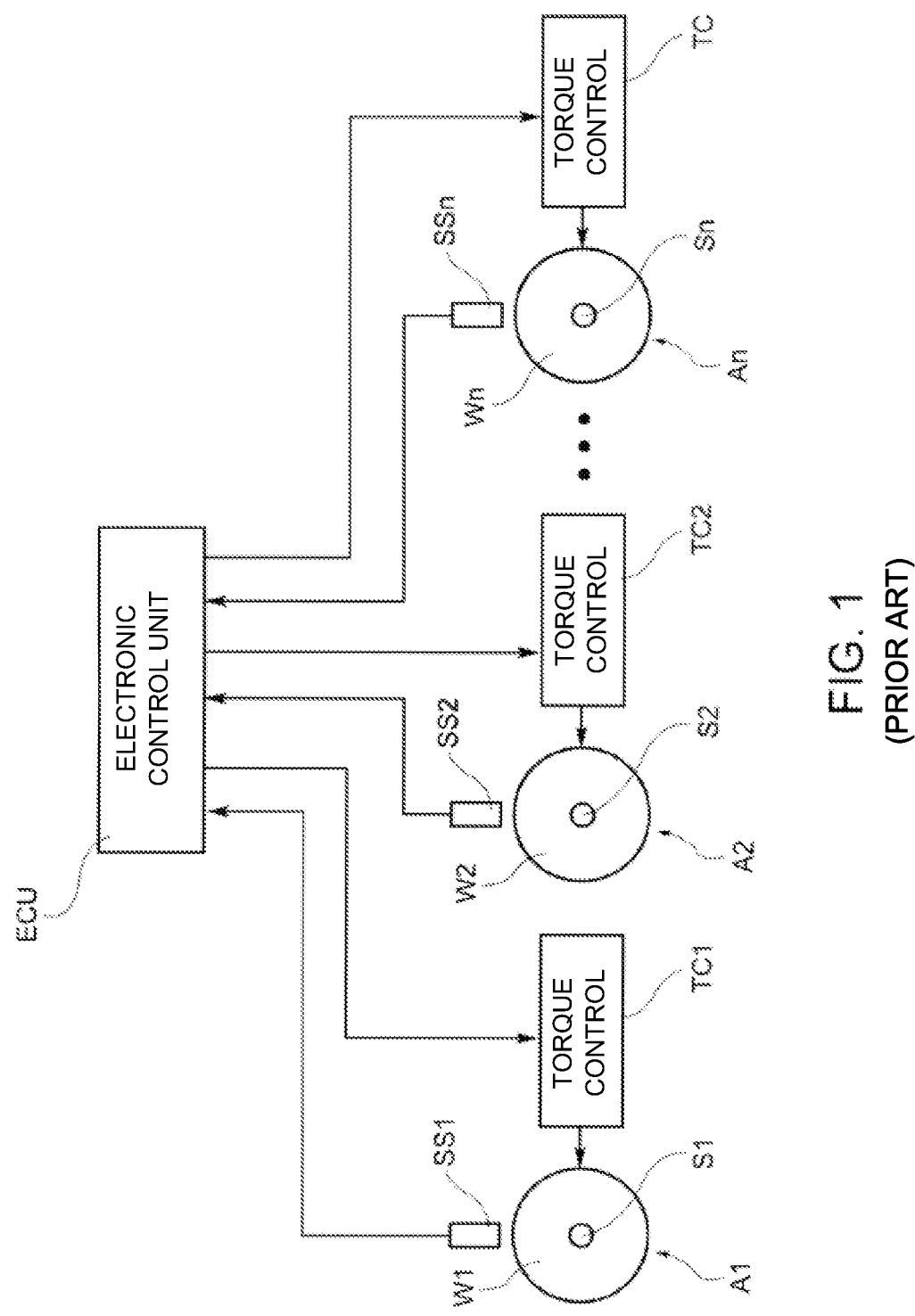
FIG. 1 illustrates an exemplary wheel adhesion control system, in anti-sliding function, according to the prior art.
Figures 2A, 2B:
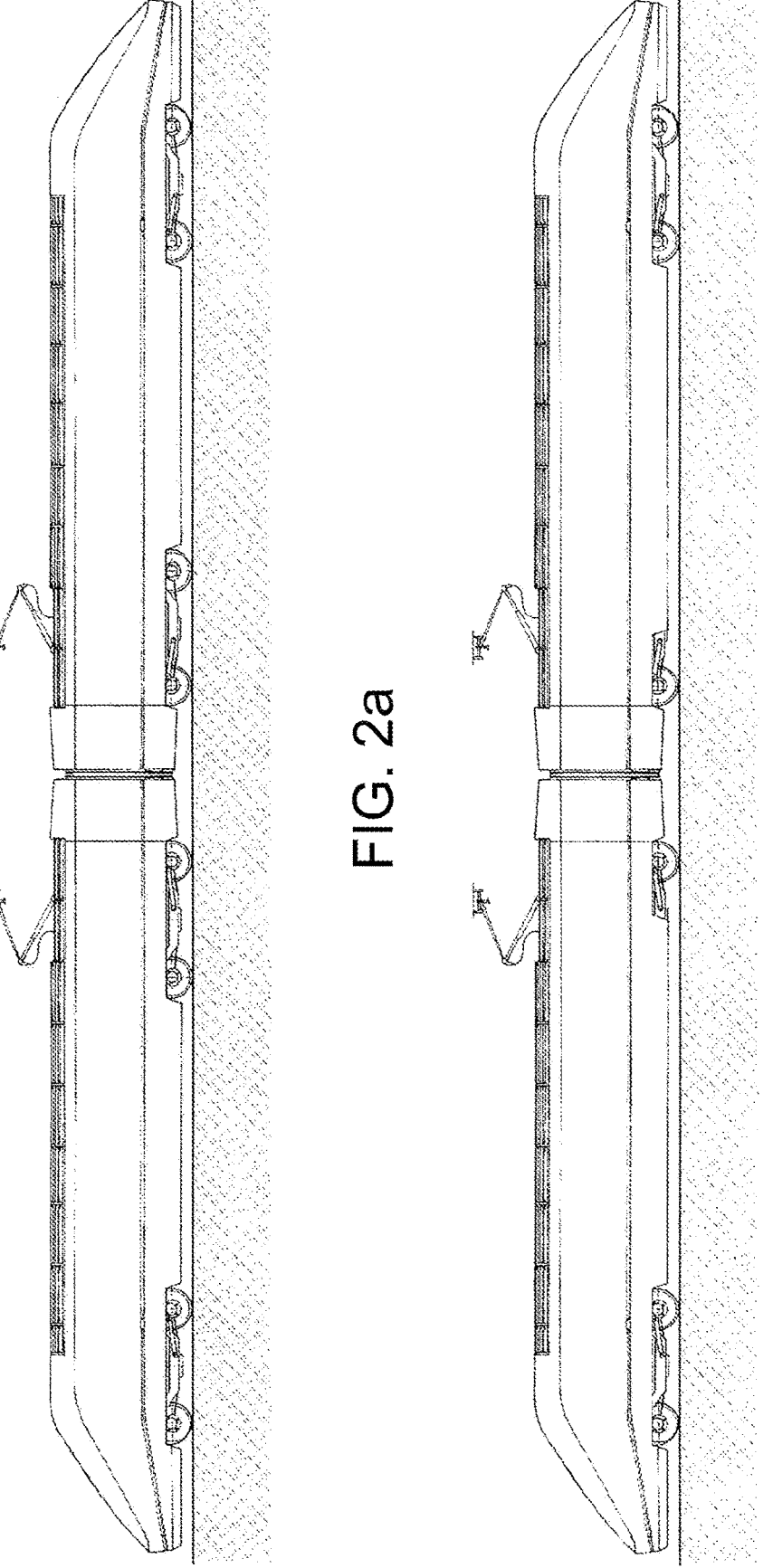
FIG. 2a shows an example of the composition of a convoy with two independent cars.
FIG. 2b shows an example of the composition of a convoy with two cars joined by means of a Jacobs bogie.

Before explaining in detail a plurality of embodiments of the invention, it should be clarified that the invention is not limited in its application to the design details and configuration of the components presented in the following description or illustrated in the drawings. The invention is able to assume other embodiments and to be implemented or constructed in practice in different ways. It should also be understood that the phraseology and terminology have a descriptive purpose and should not be construed as limiting. The use of "include" and "comprise" and the variations thereof are intended to cover the elements set out below and their equivalents, as well as additional elements and the equivalents thereof.

Figure 3:
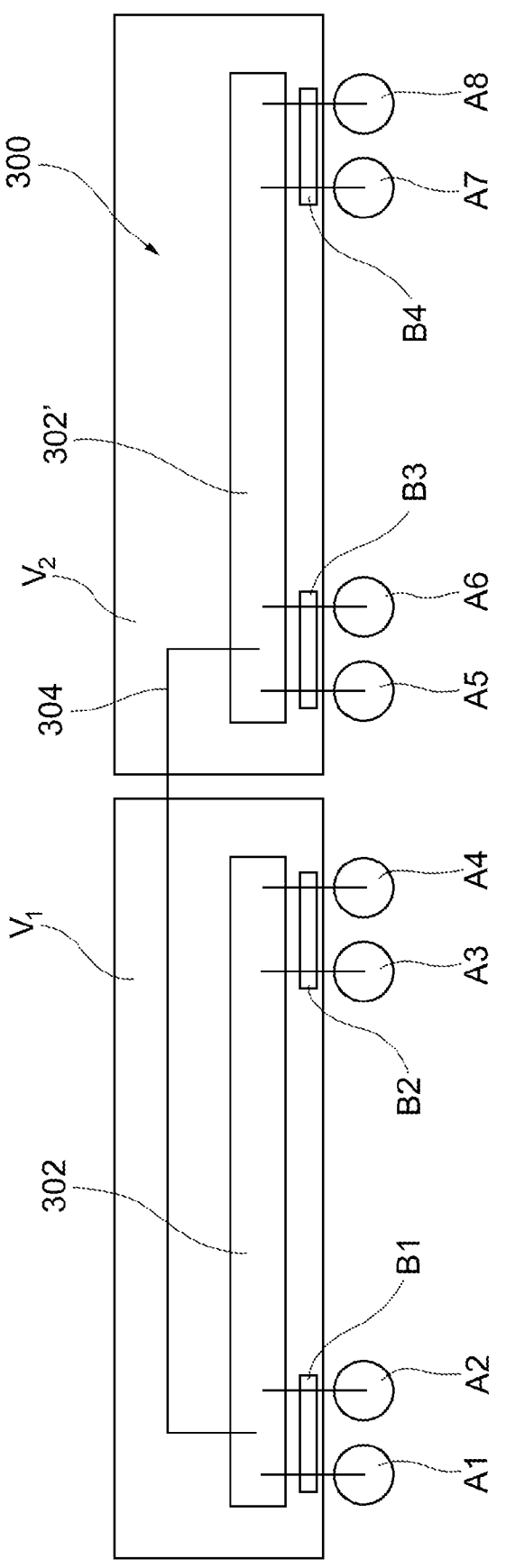
FIG. 3 illustrates one embodiment of a system for determining a forward speed of at least one vehicle.

In FIG. 3, an exemplary embodiment of a system 300 for determining a forward speed of at least one vehicle is shown.

In a first embodiment, the system 300 for determining a forward speed of at least one vehicle comprises a plurality of control means 302, 302', 302", 302'". Each control means 302, 302', 302", 302'" is associated with at least one axle A1, A2, A3, A4, A5, A6, A7, A8 of a bogie B1, B2, B3, B4 of the vehicle. Preferably, as shown by way of example in FIG. 3, a first control means may control all axles of the bogies of a car, e.g. may control 4 axles of 2 bogies of a vehicle, and, in a further non-limiting example illustrated in FIG. 4, a first control means may control all axles of a first bogie of a vehicle, e.g. may control 2 axles of a bogie, and a second control means may control all axles of a second bogie of the same vehicle, e.g. may control 2 axles of the second bogie.

Clearly, the number of axles or bogies, in additional vehicle types, may also be different from that just stated for illustrative purposes.

Preferably, a control means may, for example, be or comprise at least one controller, processor, micro-controller, micro-processor, control unit, control module, FPGA, PLC, or the like.

The system 300 for determining a forward speed of at least one vehicle further comprises a communication means 304 arranged to permit transmission of signals or values between said plurality of control means. Preferably, the measurement instants that are successive in time may be defined in accordance with a predetermined measurement period.

Each control means 302, 302', 302", 302'" is arranged to generate a corresponding sliding signal indicative of a sliding or no-sliding condition of the respective at least one axle with which it is associated.

Between said measurement instants there is at least one sharing instant in which each control means 302, 302', 302", 302'" is arranged to transmit, to the other control means, the respective sliding signal, and at least in the no-sliding condition of the respective axle, the value of a quantity related to the rotation of the respective axle or its own estimated forward speed of the vehicle determined as a function of the value of said quantity related to the rotation of the respective axle.

Preferably, for example, the value of a quantity related to the rotation of the respective axle may be the angular velocity of said axle or the frequency of rotation of said axle, or any other quantity related to the rotation of said axle.

A predetermined control means of the plurality of control means 302, 302', 302", 302'" is arranged, when all the sliding signals indicate a sliding condition of the respective axles, to control first braking means associated with one of said axles, so as to reduce a braking force applied to said axle, in order to bring said axle into a no-sliding condition.

In one example, the braking force may be reduced to the point of bringing said axle into the "idle" axle condition.

In other words, only when all the axles of the at least one vehicle are in a sliding phase and are unable to give a reliable indication concerning the rotation of said axles, will it be necessary to reduce the braking force applied to an axle, so that said axle may return to rotation and give a reliable indication from which the forward speed of the vehicle can be derived. It is sufficient for at least one axle of the at least one vehicle to be in or to return to a no-sliding phase so that it is no longer necessary to maintain an axle with an unbraked condition.

Each control means 302, 302', 302", 302'" is arranged, when it detects a sliding condition of the at least one respective axle with which it is associated, to determine its own estimated forward speed of the vehicle based on at least one value of said quantity related to the rotation of the respective axle transmitted by at least one control means whose associated axle is in a no-sliding condition, or determine its own estimated forward speed of the vehicle based on an estimated forward speed of the vehicle transmitted by another control means whose associated axle is in a no-sliding condition.

Preferably, the axle at which the predetermined control means reduces the braking force may be an axle associated with said predetermined control means.

Preferably, the axle at which said predetermined control means reduces the braking force may be the axle associated with another of said control means.

Preferably, the predetermined control means may be arranged to keep the braking force applied to at least one axle reduced, at least until the occurrence of a subsequent measurement instant.

Preferably, the communication means 304 may be arranged to allow transmission of signals or values between the plurality of control means 302, 302', 302", 302'" according to a predetermined safety protocol. Preferably, the predetermined safety protocol is a "black channel" protocol.

Preferably, each control means 302, 302', 302", 302'" may be a control means arranged to manage braking of the at least one associated axle or, for example, a control means of an electronic unit of a WSP system. In other words, a control means that is already in charge of controlling the braking of one or more axles may additionally be used as a control means for determining the forward speed of the at least one vehicle.

Preferably, each control means 302, 302', 302", 302'" may be arranged to:

when it receives a value of the quantity related to the rotation of the respective axle from at least one other control means, compare the value of the quantity related to the rotation of the respective axle with which it is associated with the value of the quantity related to the rotation of the respective axle transmitted by the at least one other control means; and —generate an alarm signal when the comparison shows that the value of the quantity related to the rotation of the respective axle with which it is associated differs by at least a predetermined threshold from the value of the quantity related to the rotation of the respective axle transmitted by the at least one other control means:

or when it receives an estimated forward speed of the vehicle determined by at least one other control means, compare the value of its own estimated forward speed of the vehicle with said estimated forward speed of the vehicle transmitted by the at least one other control means; and generate an alarm signal when the comparison shows that the value of its estimated forward speed of the vehicle differs by at least a predetermined threshold from the value of the estimated forward speed of the vehicle transmitted by the at least one other control means.

For example, the alarm signal could be provided, for example, to a display of the vehicle's engineer or driver, to an additional on-board vehicle control unit, or, via radio or wireless communication means, to a remote control center.

Preferably, each control means 302, 302', 302", 302'" may be arranged to:

when it receives a value of the quantity related to the rotation of the respective axle from at least one other control means, determine that an effective value of the quantity related to the rotation of the respective axle corresponds to the greater of the value of the quantity related to the rotation of the respective axle with which it is associated and the value of the quantity related to the rotation of the respective axle transmitted by at least one other control means:

or, when it receives an estimated forward speed of the vehicle determined by at least one other control means, determine that an effective value of the forward speed of the vehicle corresponds to the greater of the value of its own estimated forward speed of the vehicle and the value of the estimated forward speed of the vehicle transmitted by the at least one other control means.

The strategy just described may be applied when the system for determining the forward speed of at least one vehicle determines that the at least one vehicle is in a braking phase.

Preferably, the maximum value may be selected by excluding values that lie outside at least one standard deviation of the mean ($1\sigma$) or at two standard deviations of the mean ($2\sigma$) or at least three standard deviations of the mean ($3\sigma$).

Preferably, alternatively, each control means 302, 302', 302", 302'" may be arranged to:

when it receives a value of the quantity related to the rotation of the respective axle from at least one other control means, determine that an effective value of the quantity related to the rotation of the respective axle corresponds to the lesser of the value of the quantity related to the rotation of the respective axle with which it is associated and the value of the quantity related to the rotation of the respective axle transmitted by at least one other control means:

or, when it receives an estimated forward speed of the vehicle determined by at least one other control means, determine that an effective value of the forward speed of the vehicle corresponds to the lesser of the value of its own estimated forward speed of the vehicle and the value of the estimated forward speed of the vehicle transmitted by the at least one other control means.

For example, the strategy just described may be applied when the system for determining the forward speed of at least one vehicle determines that the at least one vehicle is in an acceleration phase.

Preferably, the minimum value may be selected by excluding the values that lie outside at least one standard deviation of the mean ($1\sigma$) or at two standard deviations of the mean ($2\sigma$) or at least three standard deviations of the mean ($3\sigma$).

Preferably, in a further alternative, each control means 302, 302', 302", 302'" may be arranged to:

when it receives a value of the quantity related to the rotation of the respective axle from at least one other control means, determine that an effective value of the quantity related to the rotation of the respective axle corresponds to the mean value between the value of the quantity related to the rotation of the respective axle with which it is associated and the value of the quantity related to the rotation of the respective axle transmitted by the at least one other control means:

or, when it receives an estimated forward speed of the vehicle determined by at least one other control means, determine that an effective value of the forward speed of the vehicle corresponds to the mean value between the value of its own estimated forward speed of the vehicle and the value of the estimated forward speed of the vehicle transmitted by the at least one other control means.

Preferably, the mean value may be selected by excluding values that lie outside at least one standard deviation of the mean ($1\sigma$) or at two standard deviations of the mean ($2\sigma$) or at least three standard deviations of the mean ($3\sigma$).

Figure 4:
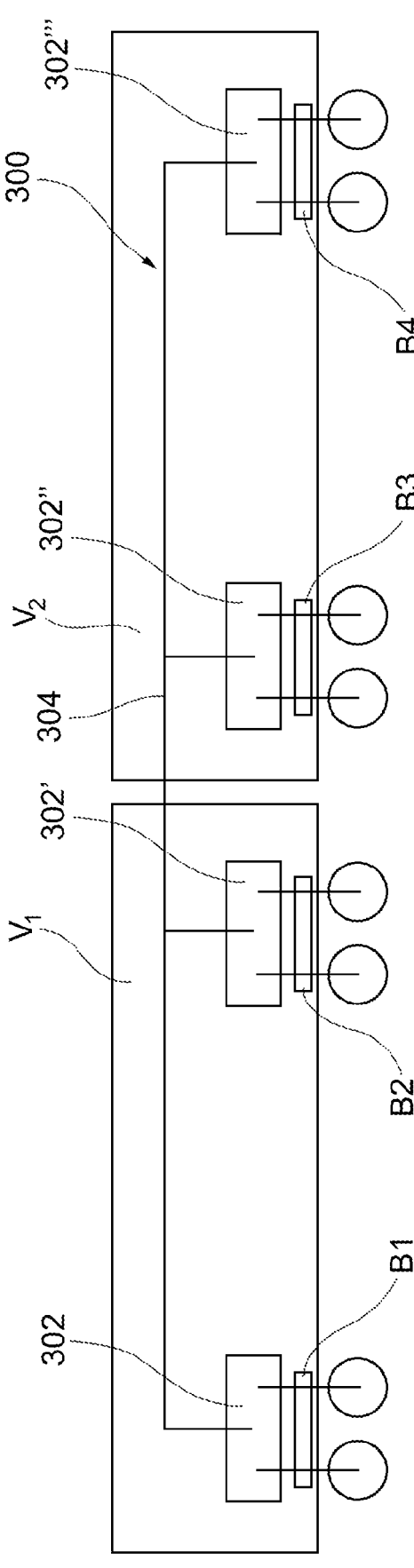
FIG. 4 illustrates a further embodiment of a system for determining a forward speed of at least one vehicle, in which a first part of said plurality of control means may be installed in a first vehicle and a second part of the plurality of control means is installed in a second vehicle.

Preferably, as can be seen in FIG. 4, the vehicles are at least a first vehicle V1 and a second vehicle V2, connected to said first vehicle, and a first part 302, 302' of said plurality of control means may be installed in said first vehicle and a second part 302", 302" of said plurality of control means may be installed in said second vehicle.

Figure 5:
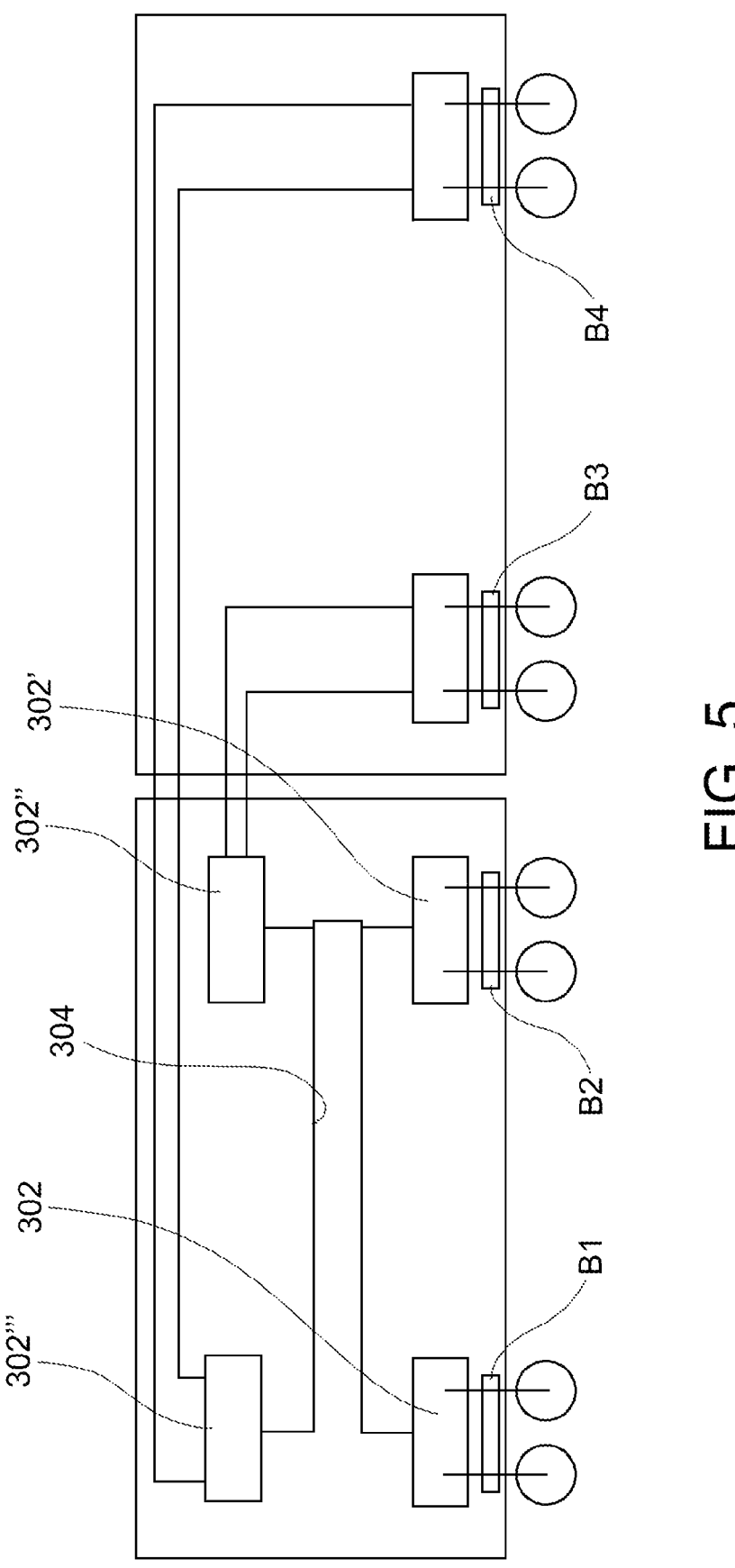
FIG. 5 illustrates yet another embodiment of a system for determining a forward speed of at least one vehicle, in which all the control means are installed on a single vehicle.

Or, preferably, as can be seen in FIG. 5, all control means 302, 302', 302", 302'" may be installed on one vehicle.

Preferably, the at least one vehicle whose system for determining the forward speed of at least one vehicle 300, according to any of the previous embodiments, determines the forward speed may be at least one railway vehicle.

In a further aspect, the present invention relates to a vehicle which comprises a plurality of axles and a system 300 for determining the forward speed of at least one vehicle according to any of the previously described embodiments.

Preferably, such a vehicle is at least one railway vehicle or rail convoy.

Preferably, in further exemplary embodiments, such a vehicle may also be a vehicle from the generic vehicle sector, e.g. wheeled vehicles or wheeled convoys, etc.

The advantage achieved is to have provided a solution that minimizes the loss of traction and braking capability of the vehicle or convoy, while maintaining the ability to ensure the determination of the forward speed of at least one vehicle or convoy.

Such a solution does not make use of one or more idle axles, which would reduce the traction and braking capacity of the vehicle (or convoy) in all conditions of adhesion (i.e., even in the case of non-degraded adhesion), but instead uses a "dynamic" idle axle, i.e., an axle that is only unbraked when necessary in the case of all the axles in the convoy being in a sliding condition. Moreover, thanks to the communication means 304, such an idle axle will be chosen unequivocally (and thus will be only one) at the level of the entire convoy.

What has been described above, where reference is made for example to the railway vehicle sector, may also find similar application in further sectors, such as the generic sector of vehicles, wheeled vehicles or wheeled convoys, which have the possibility of bringing an axle into the so-called "idle" axle condition in the event of sliding.

Various aspects and embodiments of a system for determining the forward speed of at least one vehicle and of a vehicle according to the invention have been described. It is understood that each embodiment may be combined with any other embodiment. Moreover, the invention is not limited to the embodiments described, but may be varied within the scope defined by the appended claims.

The invention claimed is:

1. A system for determining the forward speed of at least one vehicle, comprising:

a plurality of control means, wherein each control means is associated with at least one axle of a bogie of said vehicle;

a communication means arranged to permit transmission of signals or values between said plurality of control means;

wherein, at measurement instants that are successive in time, each control means is arranged to generate a corresponding sliding signal indicative of a sliding or no-sliding condition of the respective at least one axle with which it is associated;

wherein, between said measurement instants, there is at least one sharing instant in which each control means is arranged to transmit, to the other control means, the respective sliding signal, and at least in the condition of no-sliding of the respective axle, the value of a quantity related to the rotation of the respective axle or its own estimated forward speed of the vehicle determined as a function of the value of said quantity related to the rotation of the respective axle;

wherein a predetermined control means of said plurality of control means is arranged to:

when all the sliding signals indicate a sliding condition of the respective axles, control first braking means associated with one of said axles, so as to reduce a braking force applied to said axle, in order to bring said axle into a no-sliding condition;

wherein each control means is arranged to, when it detects a sliding condition of the at least one respective axle with which it is associated, determine its own estimated forward speed of the vehicle based on at least one value of said quantity related to the rotation of the respective axle transmitted by at least one control means whose associated axle is in the no-sliding condition, or determine its own estimated forward speed of the vehicle based on an estimated forward speed of the vehicle transmitted by another control means whose associated axle is in the no-sliding condition.

2. The system for determining the forward speed of at least one vehicle according to claim 1, wherein the axle at which said predetermined control means reduces the braking force is the axle associated with said predetermined control means.

3. The system for determining the forward speed of at least one vehicle according to claim 1, wherein the axle at which said predetermined control means reduces the braking force is the axle associated with another of said control means.

4. The system for determining the forward speed of at least one vehicle according to any one of the preceding claim 1, wherein said predetermined control means is arranged to keep said braking force applied to said at least one axle reduced, at least until the occurrence of a subsequent measurement instant.

5. The system for determining the forward speed of at least one vehicle according to any one of the preceding claim 1, wherein said communication means is arranged to allow the transmission of signals or values between said plurality of control means according to a predetermined safety protocol.

6. The system for determining the forward speed of at least one vehicle according to claim 5, wherein said predetermined safety protocol is a "black channel" protocol.

7. The system for determining the forward speed of at least one vehicle according to claim 1, wherein each control means is a control means arranged to manage the braking of the at least one associated axle.

8. The system for determining the forward speed of at least one vehicle according to claim 1, wherein each control means is arranged to:

when it receives a value of the quantity related to the rotation of the respective axle from at least one other control means, compare the value of the quantity related to the rotation of the respective axle with which it is associated with the value of the quantity related to the rotation of the respective axle transmitted by the at least one other control means; and generate an alarm signal when the comparison shows that the value of the quantity related to the rotation of the respective axle with which it is associated differs by at least a predetermined threshold from the value of the quantity related to the rotation of the respective axle transmitted by the at least one other control means; or when it receives an estimated forward speed of the vehicle determined by at least one other control means, compare the value of its own estimated forward speed of the vehicle with said estimated forward speed of the vehicle transmitted by the at least one other control means; and generate an alarm signal when the comparison shows that the value of its estimated forward speed of the vehicle differs by at least a predetermined threshold from the value of the estimated forward speed of the vehicle transmitted by the at least one other control means.

9. The system for determining the forward speed of at least one vehicle according to claim 1, wherein each control means is arranged to:

when it receives a value of the quantity related to the rotation of the respective axle from at least one other control means, determine that an effective value of the quantity related to the rotation of the respective axle corresponds to the greater of the value of the quantity related to the rotation of the respective axle with which it is associated and the value of the quantity related to the rotation of the respective axle transmitted by the at least one other control means;

or, when it receives an estimated forward speed of the vehicle determined by at least one other control means, determine that an effective value of the forward speed of the vehicle corresponds to the greater of the value of its own estimated forward speed of the vehicle and the value of the estimated forward speed of the vehicle transmitted by the at least one other control means.

10. The system for determining the forward speed of at least one vehicle according to of claim 1, wherein each control means is arranged to:

when it receives a value of the quantity related to the rotation of the respective axle from at least one other control means, determine that an effective value of the quantity related to the rotation of the respective axle corresponds to the lesser of the value of the quantity related to the rotation of the respective axle with which it is associated and the value of the quantity related to the rotation of the respective axle transmitted by the at least one other control means;

or, when it receives an estimated forward speed of the vehicle determined by at least one other control means, determine that an effective value of the forward speed of the vehicle corresponds to the lesser of the value of its own estimated forward speed of the vehicle and the value of the estimated forward speed of the vehicle transmitted by the at least one other control means.

11. The system for determining the forward speed of at least one vehicle according to claim 1, wherein each control means is arranged to:

when it receives a value of the quantity related to the rotation of the respective axle from at least one other control means, determine that an effective value of the quantity related to the rotation of the respective axle corresponds to the mean value between the value of the quantity related to the rotation of the respective axle with which it is associated and the value of the quantity related to the rotation of the respective axle transmitted by the at least one other control means;

or, when it receives an estimated forward speed of the vehicle determined by at least one other control means, determine that an effective value of the forward speed of the vehicle corresponds to the mean value between the value of its own estimated forward speed of the vehicle and the value of the estimated forward speed of the vehicle transmitted by the at least one other control means.

12. The system for determining the forward speed of at least one vehicle according to claim 1, wherein the vehicles are at least a first vehicle and a second vehicle, connected to said first vehicle, and a first part of said plurality of control means is installed in said first vehicle and a second part of said plurality of control means is installed in said second vehicle.

13. The system for determining the forward speed of at least one vehicle according to claim 1, wherein all control means are installed on a single vehicle.

14. A vehicle comprising a plurality of axles and a system for determining the forward speed of at least one vehicle according to claim 1.

15. The vehicle according to claim 14, wherein said vehicle is at least one railway vehicle or a rail convoy.

\* \* \* \* \*